United States Patent
Qian

(10) Patent No.: US 9,170,450 B2
(45) Date of Patent: Oct. 27, 2015

(54) PRINTED FLEXIBLE DISPLAY HAVING GRATING

(75) Inventor: Jun Qian, Wuhan (CN)

(73) Assignee: BEIJING SAN WU JIU INVESTMENT CO., LTD., Beijing (CN)

( * ) Notice: Subject to any disclaimer, the term of this patent is extended or adjusted under 35 U.S.C. 154(b) by 0 days.

(21) Appl. No.: 14/119,569

(22) PCT Filed: Jul. 16, 2012

(86) PCT No.: PCT/CN2012/078678
§ 371 (c)(1),
(2), (4) Date: Nov. 22, 2013

(87) PCT Pub. No.: WO2013/010466
PCT Pub. Date: Jan. 24, 2013

(65) Prior Publication Data
US 2014/0098326 A1  Apr. 10, 2014

(30) Foreign Application Priority Data
Jul. 21, 2011  (CN) .......................... 2011 1 0205239

(51) Int. Cl.
G02F 1/1333  (2006.01)
G02F 1/1335  (2006.01)
G02F 1/1334  (2006.01)
G02B 27/22  (2006.01)

(52) U.S. Cl.
CPC ...... *G02F 1/133504* (2013.01); *G02B 27/2214* (2013.01); *G02F 1/1334* (2013.01); *G02F1/133305* (2013.01); *G02F 1/133514* (2013.01); *G02F 1/133516* (2013.01); *G02F 1/133526* (2013.01)

(58) Field of Classification Search
CPC ............ G02F 1/1334; G02F 1/133504; G02F 1/133526; G02F 1/133305; G02F 1/133516; G02B 27/2214
USPC .............................................. 349/86, 95, 106
See application file for complete search history.

(56) References Cited

U.S. PATENT DOCUMENTS

| | | | |
|---|---|---|---|
| 6,010,292 A | 1/2000 | Fantone | |
| 7,119,859 B2 * | 10/2006 | Chari et al. | 349/88 |
| 2011/0205468 A1 * | 8/2011 | Hirakata et al. | 349/95 |
| 2011/0242461 A1 * | 10/2011 | Escuti et al. | 349/96 |

FOREIGN PATENT DOCUMENTS

| | | | |
|---|---|---|---|
| CN | 1147234 A | | 4/1997 |
| CN | 101290447 A | | 10/2008 |
| CN | 101290448 A | | 10/2008 |
| CN | 201707518 U | * | 1/2011 |
| CN | 202177764 U | | 3/2013 |
| WO | 9526916 A | | 10/1995 |

OTHER PUBLICATIONS

International Search Report from PCT/CN2012/078678 mailed Oct. 4, 2012, 5 pages.

* cited by examiner

*Primary Examiner* — Nathanael R Briggs
(74) *Attorney, Agent, or Firm* — Calfee, Halter & Griswold LLP

(57) ABSTRACT

A printed flexible display having grating, comprising a printable layer, a printing ink layer, a grating layer, an electrode layer A, an electrically-controlled optical switch layer, and an electrode layer B which are arranged successively from top to bottom. The printable layer is a flexible insulating material that is foldable and printable. The printing ink layer is a CMYK ink dot matrix printed on the printable layer. The grating layer is a lenticular grating plate. The printing ink layer is arranged on a focal plane of the lenticular grating plate. The thickness of the grating layer equals to the absolute value of an object-side focal length of the lenticular grating plate. The electrode layer A and the electrode layer B are both ITO conductive thin film layers having electrode array engraved thereon, while the electrode arrays of both are perpendicular in direction. The electrically-controlled optical switch layer is a PDLC thin film. The display allows for facilitated three-dimensional visual effects, facilitated colorization, shortened response time, reduced driving voltage, comfortable reading, and reduced costs.

7 Claims, 1 Drawing Sheet

Protection layer
Diffuse reflection layer
Electrode layer B
Electrically-controlled optical switch layer
Electrode layer A
Transmissive layer
Grating layer
Printing ink layer
Printable layer

| Protection layer |
| --- |
| Diffuse reflection layer |
| Electrode layer B |
| Electrically-controlled optical switch layer |
| Electrode layer A |
| Transmissive layer |
| Grating layer |
| Printing ink layer |
| Printable layer |

PRINTED FLEXIBLE DISPLAY HAVING GRATING

CROSS-REFERENCE TO RELATED APPLICATION

This application is the U.S. national phase entry of PCT/CN2012/078678, with an international filing date of 16 Jul. 2012, which claims the benefit of Chinese Application Serial No. 201110205239.9, with a filing date of 21 Jul. 2011, the entire disclosures of which are fully incorporated herein by reference.

FIELD OF THE INVENTION

The present invention relates to a printed flexible display having grating, pertaining to the field of printing, and also pertaining to the field of electronics.

DESCRIPTION OF THE PRIOR ART

The current display technology can be divided into two categories. One of them is paper display, whose main features are described as follows: displaying content by reflecting ambient light, facilitating color display, and having large viewing angle (close to 180°) and soft medium. The other one is electronic display such as CRT, LCD, LED, etc., whose main features are described as follows: allowing information to be fast refreshed, displaying via the display's own internal light, consuming more power during work, rather fatiguing over reading, and having inflexible medium.

Over the past decade people are focusing on the development of a paper-like reflection flexible displays (commonly known as e-paper), with an attempt to overcome the shortcomings of the aforementioned two types of display technology and retain their advantages, namely, to allow the new display have following features such as a flexible medium, fast display through electrical control, display by reflecting ambient light, low-power consuming, and portability. Such flexible display can be applied to e-books, cars, smart cards, labels, digital signatures, display and other fields. As far as paper-like reflection flexible display research and development is concerned, the rapid development has been made by E-Ink, Philips, IBM, Bell Labs and other international companies on electrophoresis, and the display principle thereof is based on the electrophoretic mobility sight of charged balls (placed in the microcapsules or cup) of different colors (basically white and black at present) under the electric field reflecting the external ambient light, thus presenting two completely different colors.

Electrophoresis-based flexible display has made some progress, but there are still a series of problems to be solved. For example, the response is slow (hundreds of milliseconds), it is difficult to achieve color (use of different filters to achieve color), it is difficult to produce a stereoscopic image display effect, and the cost of production is high.

SUMMARY OF THE INVENTION

The objective of the present invention is to overcome the defects of prior art and to provide a printed flexible display having grating. The display uses natural light as its light source, and its color vision is formed by reflected light. The grating facilitates producing three-dimensional vision effect, thus to make it more suitable for reading and have advantages such as, easy colorization, fast response, and low-cost.

To achieve the above object, the present invention adopts the technical solution described as follows:

A printed flexible display having grating, including a printable layer and a printing ink layer attached on the printable layer, at least a grating layer, an electrode layer A, electrically-controlled optical switch layer and an electrode layer B are attached on the printing ink layer successively from the bottom to top. The printable layer is a flexible insulating material that is foldable and printable. The printing ink layer is a CMYK colorful ink dot matrix printed with ink on the printable layer. The grating layer is a lenticular grating plate. The printing ink layer is arranged on a focal plane of the lenticular grating plate. The thickness of the grating layer equals the absolute value of the object-side focal length of the lenticular grating plate. The electrode layer A and the electrode layer B are both ITO conductive film layers having electrode array engraved thereon, while the electrode array of the electrode layer A is perpendicular in direction to the electrode array of electrode layer B. The electrically-controlled optical switch layer is a polymer-dispersed liquid crystal film.

The diffuse reflection layer is attached on the electrode layer B, and the diffuse reflection layer is a matt film or varnish having a diffuse reflection function.

The diffuse reflection layer is attached with a protective layer, and the protective layer is an acrylic resin film or aluminum oxide film.

The electrode layer B is attached with a protective layer, and the protective layer is an acrylic resin film or aluminum oxide film.

The distance between the printing ink layer and an electrically-controlled optical switch layer ensures that the printing ink layer is completely covered and opaque in unpowered state.

A transmissive layer attached on the grating layer is disposed between the electrode layer A and the grating layer, and the electrode layer A is attached on the transmissive layer, and the materials used by the transmissive layer and the grating layer are of the same refractive index. The sum of the thicknesses of the grating layer and the transmissive layer equals to the distance between the printing ink layer and the electrically-controlled optical switch.

The thickness of the display is no more than 5 mm.

The advantages of the present invention compared with the prior art are described as follows:

1. The display provided by the present invention uses a lenticular grating plate, so that the light emitted from different positions on the printing ink layer is refracted by the cylindrical lens element of the lenticular grating plate to form very fine parallel light beams, carrying the respective information along their respective the direction of transmission. If the image on the printing ink layer is processed into two according to the grating pitch, which are arranged in a certain order on the focal plane of the lenticular grating plate, the two images can respectively be refracted into the both eyes of the people through cylindrical lens element to produce three-dimensional visual sense to achieve three-dimensional image display effect.

2. The present invention provides a printed flexible display adopting printing ink technology as a basis for the black-and-white and color display, using the mature FM screening printing technology to achieve higher resolution to improve the accuracy of the output. While taking the advantage of the color vision mixing principle in printing, by superimposing the printed dot matrix reflected light to obtain a variety of colors. The color display solution technology is more mature and the method is simple and effective, and the display is more colorful.

3. The present invention provides a display using the polymer-dispersed liquid crystal (PDLC) film as the electrically-controlled optical switch, the response time thereof may be shortened to 40 ms, and the driving voltage may be reduced to 25V, which is significantly better than the current mainstream E-INK technology (whose response time is about 150 ms, and the driving voltage is about 90V). In addition, PDLC film does not need a polarizer, it exists in the form of a solid film and preparation process thereof is easy to implement, which is suitable for roll-to-roll continuous processing. The production process is simple with low production cost, so that it is suitable for mass production. Whereas a display using an electro-optic crystal as the electrically-controlled optical switch requires relatively high driving voltage (about 443V), and the preparation process of the solid-state membrane is complex with high cost, although the response time is short. In contrast, the display provided in the present invention is remarkably advantageous in the aspects of the driving voltage, the production process and the production cost.

4. The current display adopting the TFT substrate as an electrode is not only structurally complex and highly costly, but also is mainly applied to the transmissive working way with the backlight source, because the TFT substrate is a film transistor. The display of the present invention uses the ITO conductive film as a control electrode, and it has a more simple structure and low cost, achieves the display by the reflection of the natural light, and does not need special light source, so that it is in line with the human eye reading habits. In addition, by using the matt film or varnish with diffuse reflection function as the diffuse reflection layer, the glare can be eliminated, which would improve the contrast and reading comfort level.

5. Each layer of the present invention is a thin film. The display has a thickness no more than 5 mm, so that the display is lightweight and easy for flexibility.

BRIEF DESCRIPTION OF THE DRAWINGS

FIG. 1 is a structural schematic diagram of the printed flexible display having grating provided by Embodiment 1.

DETAILED DESCRIPTION OF THE PREFERRED EMBODIMENTS

The present invention is further illustrated by the following specific embodiments, but the protecting scope of the present invention is not limited to the following Embodiments.

Embodiment 1

As shown in FIG. 1, the bottom layer of the printed flexible touch screen having grating provided by the present embodiment is a printable layer, and the printing ink layer is attached on the printable layer. A grating layer, a transmissive layer, an electrode layer A, an electrically-controlled optical switch layer, an electrode layer B, a diffuse reflection layer, and a protection layer are attached sequentially on the printing ink layer from bottom to top. The thickness of the display is no more than 5 mm.

The printable layer uses a flexible insulating material that is foldable and printable, such as paper, plastic, cloth, and so on. Inks are printed on the printable layer to produce color CMYK ink dot matrix so as to obtain a printing ink layer.

The grating layer is a lenticular grating plate composed of several cylindrical lens elements with identical structure and property that are arranged in a planar linear form. The printing ink layer is arranged on a focal plane of the lenticular grating plate. The thickness of the grating layer equals the absolute value of an object-side focal length of the lenticular grating plate. The material of the lenticular grating plate is highly transmissive polymer materials, and any common materials that can be used to manufacture the lenticular grating plate are applicable to the present utility model, such as PET, PETG, PVC, PP, etc. The distance between the printing ink layer and an electrically-controlled optical switch layer ensures that the printing ink layer is completely covered and opaque in an unpowered state. When the thickness of the grating layer is less than the distance between the printing ink layer and the electrically-controlled optical switch layer, a transmissive layer is needed to be added between the grating layer and the electrode layer A. The refractive index of the materials used in the transmissive layer is the same with the refractive index of the materials used in the grating layer, and the sum of the thicknesses of the transmissive layer and the grating layer equals to the distance between the printing ink layer and the electrically-controlled optical switch layer. In the present embodiment, the transmissive layer is provided between the grating layer and the electrode layer A.

The electrode layer A and the electrode layer B are both ITO conductive film layers engraved with electrode array. The ITO conductive film layer as the electrode layer A and the ITO conductive film layer as the electrode layer B are, respectively, attached on two sides of the electrically-controlled optical switch layer. The electrode array of electrode layer A and the electrode layer B are perpendicular in direction. In the present embodiment, the electrode array of the electrode layer A is in the X-axis direction, and the electrode array of the electrode layer B is in the Y-axis direction.

The electrically-controlled optical switch layer uses a polymer-dispersed liquid crystal (PDLC) film, and this layer is the display control switch of the screen to achieve a color display by controlling the CMYK color ink dot matrix on the printing ink layer. Generally speaking, the thicker the electrically-controlled optical switch layer is, the higher the contrast ratio is.

The diffuse reflection layer uses matt film or varnish with diffuse reflection function, and this layer is used to eliminate glare and improve the readability of the display.

The protective layer uses films which can protect display from external scratches, water vapor, oxygen and light damage to the film, such as acrylic resin film and aluminum oxide film.

Embodiment 2

The bottom layer of the printed flexible display having grating provided by the present embodiment is a printable layer, and a printing ink layer is attached on the printable layer. A grating layer, an electrode layer A, an electrically-controlled optical switch layer, an electrode layer B, a diffuse reflection layer are attached sequentially on the printing ink layer from bottom to up. The thickness of the display is no more than 5 mm. The materials of the layers are the same as that in Embodiment 1.

Embodiment 3

The bottom layer of the printed flexible display having grating provided by the present embodiment is a printable layer, and a printing ink layer is attached on the printable layer. A grating layer, an electrode layer A, an electrically-controlled optical switch layer, an electrode layer B, and a protection layer are attached sequentially on the printing ink layer from bottom to up. The thickness of the display is no more than 5 mm. The materials of the layers are the same as that in Embodiment 1.

The method for preparing the printed flexible display having grating of the present invention is described as follows:

(1) Gravure is used to print ink on the printable layer to produce color CMYK ink dot matrix, to obtain a printable layer attached with a printing ink layer, and the process thereof is described as follows: preparing the flexible substrate→mounting plate→adjusting the alignment→formally printing→processing after printing. The gravure printing machine is of high automation, with good quality of plate making and simple operation.

(2) The lenticular grating plate is prepared to obtain the grating layer, so that the thickness of the grating layer equals to absolute value of the object-side focal length of the lenticular grating plate. The grating layer is pasted with transparent insulating glue on the printing ink layer, and the printing ink layer is located on the focal plane of the lenticular grating plate.

(3) A polymerization phase separation method is used to prepare PDLC and coat the PDLC on the electrode layer A, and light (UV) curing method is used to cure it to obtain the electrically-controlled optical switch layer.

(4) A transparent indium tin oxide coating layer is sputtered respectively on both sides of the electrically-controlled optical switch layer to obtain ITO conductive films. Electrode arrays are processed on the ITO conductive films on both sides of the electrically-controlled optical switch layer, so that the electrode arrays of both ITO conductive films are perpendicular in direction. The ITO conductive film close to the grating layer is used as the electrode layer A, and the other ITO conductive film is used as the electrode layer B. When the thickness of the grating layer is less than the distance between the printing ink layer and the electrically-controlled optical switch layer, a transmissive layer is added between the grating layer and the electrode layer A, and the refractive index of the materials used in the transmissive layer and the grating layer are the same, and the sum of the thicknesses of the transmissive layer and the grating layer equals to the distance between the printing ink layer and the electrically-controlled optical switch layer. The transmissive layer is glued on the curved surface of the grating layer with transparent insulating glue, and then the transmissive layer and the electrode layer A are glued together. When the grating layer has a thickness equal to the distance between the printing ink layer and the electrically-controlled optical switch layer, the electrode layer A is directly glued on the curved surface of the grating layer.

(5) A matt film or varnish having a diffuse reflection function is used as the diffuse reflection layer. When the matt film is used, an insulating transparent adhesive such as UV adhesive is used to glue the matt film on the electrode layer B to obtain a diffuse reflection layer. When a varnish having diffuse reflection function varnish is used, the varnish is directly coated on the electrode layer B, and then light (UV) curing is performed to obtain a diffuse reflection layer.

(6) Films for protecting the screen from external scratches, water vapor, oxygen and light damage, such as an acrylic resin film, aluminum oxide film is used as a protective layer. The protective layer is glued on the diffuse reflection layer with insulating transparent adhesive such as UV adhesive, and finally sealing it with sealing glue.

The display principle of the printed flexible display having grating of the present invention is described as follows:

The electrically-controlled optical switch layer uses PDLC, which is obtained according to the following process. Low molecular weight liquid crystal is mixed with the prepolymer to form micron-sized liquid crystal droplets uniformly dispersed in the polymer network under certain conditions by the polymerization reaction, and the material having an electro-optical response characteristic is obtained by using dielectric anisotropy of the liquid crystal molecules. It mainly works between a scattering state and a transparent state, and has a certain gray level. In the unpowered state, it has a diffuse reflection characteristic per se, in milky white, and it becomes transparent in power-on state. Electrically-controlled optical switch layer controls CMYK color ink dot matrix to actualize color display, and then color printing ink layer is formed. When the electrically-controlled optical switch layer is powered under an appropriate voltage, the film becomes transparent and displays the color of the printing ink layer, due to the orientation of the liquid crystal molecules. A blank area for the non-image area is not applied with voltage, and the liquid crystal molecules in the electrically-controlled optical switch layer become disorderly, and the film has certain opacity as the color of white is displayed.

Each cylindrical lens element on the lenticular grating plate does not play a role of a convergent lens in a direction perpendicular to its arrangement direction, but in its arrangement direction is equivalent to a convergent lens playing its role of converging imaging. The plane of the lenticular grating plate is the focal plane. The printing ink layer is located on the focal plane, so that the light emitted from different positions on the printing ink layer is refracted by the cylindrical lens element to form very fine parallel light beams, carrying the respective information along their respective direction of transmission. If the image of the printing ink layer is processed into two according to the grating pitch and is arranged in a certain order on the focal plane of the lenticular plate, the two images can respectively be refracted into the both eyes of the people through cylindrical lens element to produce three-dimensional visual sense to achieve three-dimensional image display effect. As long as the lenticular grating plate thickness d, the object side focal length f, the radius of curvature R and the refractive index n satisfy the equation $f=nR/(n-1)=-d$, an optimal stereoscopic display effect can be obtained.

What is claimed is:

1. A printed flexible display having grating, comprising a printable layer and a printing ink layer attached on the printable layer, wherein at least a grating layer, an electrode layer A, an electrically-controlled optical switch layer and an electrode layer B are attached on the printing ink layer successively from bottom to top, the printable layer is a flexible insulating material that is foldable and printable, the printing ink layer is a CMYK color ink dot matrix printed with ink on the printable layer, the grating layer is a lenticular grating plate, the printing ink layer is arranged on a focal plane of the lenticular grating plate, the thickness of the grating layer equals to the absolute value of the object-side focal length of the lenticular grating plate, the electrode layer A and the electrode layer B are both ITO conductive film layers having electrode array engraved thereon, while the electrode array of the electrode layer A is perpendicular in direction to the electrode array of the electrode layer B, and the electrically-controlled optical switch layer is a polymer-dispersed liquid crystal film.

2. The printed flexible display having grating according to claim 1, wherein a diffuse reflection layer is attached on the electrode layer B, and the diffuse reflection layer is a matt film or varnish having a diffuse reflection function.

3. The printed flexible display having grating according to claim 2, wherein the diffuse reflection layer is attached with a protective layer, and the protective layer is an acrylic resin film or aluminum oxide film.

4. The printed flexible display having grating according to claim 1, wherein the electrode layer B is attached with a protective layer, the protective layer is an acrylic resin film or aluminum oxide film.

5. The printed flexible display having grating according to claim 1, wherein the distance between the printing ink layer and the electrically-controlled optical switch layer ensures that the printing ink layer is completely covered and opaque in unpowered state.

6. The printed flexible display having grating according to claim 5, wherein a transmissive layer attached on the grating layer is disposed between the electrode layer A and the grating layer, the electrode layer A is attached on the transmissive layer, and the materials used by the transmissive layer and the grating layer are of the same refractive index, and the sum of the thicknesses of the grating layer and the transmissive layer equals to the distance between the printing ink layer and the electrically-controlled optical switch layer.

7. The printed flexible display having grating according to claim 1, wherein the thickness of the display is no more than 5 mm.

* * * * *